US009292602B2

(12) United States Patent
Morris et al.

(10) Patent No.: US 9,292,602 B2
(45) Date of Patent: Mar. 22, 2016

(54) INTERACTIVE SEARCH RESULTS PAGE

(75) Inventors: Meredith June Morris, Bellevue, WA (US); Scott Joseph Counts, Seattle, WA (US); Asta Jane Roseway, Bellevue, WA (US); Julia Schwarz, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 12/967,073

(22) Filed: Dec. 14, 2010

(65) Prior Publication Data

US 2012/0150972 A1    Jun. 14, 2012

(51) Int. Cl.
  *G06F 17/30*  (2006.01)
  *G06Q 50/00*  (2012.01)

(52) U.S. Cl.
  CPC .......... *G06F 17/30864* (2013.01); *G06Q 50/00* (2013.01)

(58) Field of Classification Search
  CPC .............. G06F 17/30864; G06F 17/30867; G06F 17/30554; G06F 17/3053; G06F 17/30675; H04L 51/32; H04L 12/588; H04L 51/12; H04L 51/16
  See application file for complete search history.

(56) References Cited

U.S. PATENT DOCUMENTS

| | | | |
|---|---|---|---|
| 7,630,972 B2 | 12/2009 | Ott, IV et al. | |
| 7,673,003 B2* | 3/2010 | Little, II | G06Q 10/107 709/204 |
| 7,716,224 B2* | 5/2010 | Reztlaf et al. | 707/741 |
| 7,831,548 B1* | 11/2010 | Round et al. | 707/609 |
| 7,831,582 B1* | 11/2010 | Scofield et al. | 707/706 |
| 8,010,460 B2* | 8/2011 | Work | G06Q 10/00 705/319 |
| 8,117,195 B1* | 2/2012 | Dave | G06F 17/30864 707/706 |
| 8,296,380 B1* | 10/2012 | Kelly | G06F 17/30528 703/23 |
| 8,332,393 B2* | 12/2012 | Elyada | G06F 17/30864 707/722 |
| 8,401,009 B1* | 3/2013 | Dorsey | H04L 51/066 370/389 |
| 8,412,704 B1* | 4/2013 | Dave | G06F 17/30864 707/726 |
| 8,448,084 B2* | 5/2013 | Brichter | G06F 3/0482 715/784 |
| 8,554,571 B1* | 10/2013 | Harrison, Jr. | G06F 17/30867 705/1.1 |
| 8,650,210 B1* | 2/2014 | Cheng | G06F 17/30864 707/707 |
| 8,849,809 B1* | 9/2014 | Seshadri | G06Q 10/00 707/725 |
| 8,862,591 B2* | 10/2014 | Chowdhury | G06F 17/2745 707/748 |
| 2002/0198866 A1* | 12/2002 | Kraft | G06F 17/30864 |
| 2003/0210649 A1* | 11/2003 | Bondi | 370/229 |
| 2004/0249790 A1* | 12/2004 | Komamura | G06F 17/3064 |
| 2005/0138002 A1* | 6/2005 | Giacobbe | G06F 17/30067 |
| 2005/0193076 A1* | 9/2005 | Flury et al. | 709/206 |
| 2005/0246420 A1* | 11/2005 | Little | G06Q 10/107 709/204 |

(Continued)

OTHER PUBLICATIONS

Olson, Jodi., "Kosmix Unleashes Our Real-Time Tweetbeat to Show What's Playing on Twitter Now", Retrieved at << http://blog.kosmix.com/ >>, Sep. 29, 2010, pp. 1-16.

(Continued)

*Primary Examiner* — Backhean Tiv
(74) *Attorney, Agent, or Firm* — Alin Corie; Sandy Swain; Micky Minhas (57) ABSTRACT

Described herein are various technologies pertaining to presenting search results to a user, wherein the search results are messages generated by way of social networking applications. An interactive graphical object is presented together with retrieved messages, and messages are filtered responsive to interactions with the interactive graphical object. Additionally, a graphical object that is indicative of credibility of a message is presented together with the message.

20 Claims, 10 Drawing Sheets

(56) References Cited

U.S. PATENT DOCUMENTS

| | | | |
|---|---|---|---|
| 2006/0271561 A1 | 11/2006 | Schlachta-Fairchild et al. | |
| 2006/0287989 A1* | 12/2006 | Glance | G06F 17/30587 |
| 2007/0130126 A1* | 6/2007 | Lucovsky | G06F 17/30864 |
| 2007/0162459 A1* | 7/2007 | Desai | G06F 17/30864 |
| 2007/0198459 A1* | 8/2007 | Boone | G06F 17/30716 |
| 2007/0198500 A1* | 8/2007 | Lucovsky | G06Q 30/02 |
| 2007/0239674 A1* | 10/2007 | Gorzela | G06F 17/30864 |
| 2007/0245245 A1 | 10/2007 | Blue et al. | |
| 2007/0260612 A1* | 11/2007 | Papakonstantinou | G06F 17/30893 |
| 2008/0005101 A1* | 1/2008 | Chandra | G06F 17/30864 |
| 2008/0071796 A1* | 3/2008 | Ghuneim | G06F 17/30554 |
| 2008/0086459 A1* | 4/2008 | Ryan | G06F 17/30864 |
| 2008/0086534 A1* | 4/2008 | Bardak et al. | 709/206 |
| 2008/0114755 A1* | 5/2008 | Wolters | G06F 17/30873 |
| 2008/0133488 A1* | 6/2008 | Bandaru | G06F 17/30864 |
| 2008/0147625 A1* | 6/2008 | Altounian | G06Q 10/087 |
| 2008/0154883 A1* | 6/2008 | Chowdhury | G06F 17/2745 |
| 2008/0154896 A1* | 6/2008 | Sarathy et al. | 707/6 |
| 2008/0183672 A1 | 7/2008 | Canon et al. | |
| 2008/0201326 A1* | 8/2008 | Cotter | G06F 17/30864 |
| 2008/0215607 A1* | 9/2008 | Kaushansky | G06Q 30/02 |
| 2008/0243799 A1* | 10/2008 | Rozich | G06F 17/30864 |
| 2008/0256040 A1* | 10/2008 | Sundaresan et al. | 707/3 |
| 2008/0301112 A1* | 12/2008 | Wu | G06Q 30/02 |
| 2009/0030940 A1* | 1/2009 | Brezina | H04M 15/00 |
| 2009/0164417 A1* | 6/2009 | Nigam et al. | 707/2 |
| 2009/0198566 A1* | 8/2009 | Greenberg | G06Q 30/0236 707/727 |
| 2009/0271281 A1* | 10/2009 | Kang | 705/26 |
| 2009/0276500 A1* | 11/2009 | Karmarkar | G06F 17/30864 709/206 |
| 2009/0287682 A1* | 11/2009 | Fujioka | G06F 17/30867 |
| 2009/0327168 A1* | 12/2009 | Weinberger et al. | 706/11 |
| 2010/0017371 A1* | 1/2010 | Whalin | G06Q 10/109 707/E17.014 |
| 2010/0017431 A1* | 1/2010 | Schmidt | G06Q 10/107 707/E17.046 |
| 2010/0058202 A1* | 3/2010 | Rostom | 715/758 |
| 2010/0121849 A1* | 5/2010 | Goeldi | G06Q 10/00 707/736 |
| 2010/0153285 A1* | 6/2010 | Anderson | G06F 17/30864 705/319 |
| 2010/0228582 A1* | 9/2010 | King | G06Q 30/02 705/14.66 |
| 2010/0229127 A1* | 9/2010 | Williams | G06F 3/0482 715/854 |
| 2010/0235375 A1* | 9/2010 | Sidhu et al. | 707/765 |
| 2010/0246797 A1* | 9/2010 | Chavez et al. | 379/265.02 |
| 2011/0022602 A1* | 1/2011 | Luo | G06F 17/3053 707/748 |
| 2011/0082907 A1* | 4/2011 | Anderson | 709/206 |
| 2011/0106895 A1* | 5/2011 | Ventilla et al. | 709/206 |
| 2011/0212430 A1* | 9/2011 | Smithmier | G09B 7/00 434/322 |
| 2011/0231296 A1* | 9/2011 | Gross | G06Q 10/10 705/37 |
| 2011/0252108 A1* | 10/2011 | Morris et al. | 709/206 |
| 2011/0270678 A1* | 11/2011 | Drummond | G06Q 30/02 705/14.52 |
| 2011/0288962 A1* | 11/2011 | Rankin, Jr. | G06F 17/30525 705/27.1 |
| 2011/0289161 A1* | 11/2011 | Rankin, Jr. | G06Q 10/107 709/206 |
| 2011/0295720 A1* | 12/2011 | Parikh et al. | 705/27.1 |
| 2011/0320538 A1* | 12/2011 | Ickman | G06F 9/542 709/206 |
| 2012/0072835 A1* | 3/2012 | Gross | G06Q 30/0269 715/243 |
| 2012/0089681 A1* | 4/2012 | Chowdhury | H04L 64/18 709/206 |
| 2012/0117059 A1* | 5/2012 | Bailey | G06F 17/30867 707/723 |
| 2012/0143963 A1* | 6/2012 | Kennberg | G06Q 10/107 709/206 |
| 2012/0150972 A1* | 6/2012 | Morris | G06F 17/30864 709/206 |
| 2012/0151359 A1* | 6/2012 | Mysen | G06F 11/3438 715/736 |
| 2012/0179552 A1* | 7/2012 | Tishkevich | G06Q 30/02 705/14.66 |

OTHER PUBLICATIONS

"Workstreamer Enables Web Listening for a Broader Audience", Retrieved at << http://billives.typepad.com/portals_and_km/trends_search/ >>, Aug. 6, 2010, pp. 1-45.

"SEO Content", Retrieved at << http://www.ecopywriters.com/downloads/WhitePaperSEOContent.pdf >>, Retrieved Oct. 4, 2010, pp. 1-14.

Solis, Brian., "Optimize Your Brand for Sharing and Social Search in 11 Steps", Retrieved at << http://searchenginewatch.com/3639981 >>, Apr. 2, 2010, pp. 1-2.

* cited by examiner

INTERACTIVE SEARCH RESULTS PAGE

BACKGROUND

Many different social networking applications currently existent that allow users thereof to generate content that can be viewable by others. An exemplary social networking application allows users to post messages that are made available to all other users of the social networking application that are contacts of such user. Additionally, the user can cause certain content generated by the user be placed in a public feed such that it is available to the general public by way of a search application.

Another exemplary social networking application is a message broadcasting application (which can also be referred to as a micro-blogging application), wherein a user of the broadcasting application can generate content that is automatically broadcast to others that subscribe to broadcasts of the user. Once a subscriber receives broadcast content, she can rebroadcast the content. Many users have also chosen to utilize blogs to make available content generated by such users. Thus, it can be ascertained that there are currently a myriad of mechanisms that can be employed to publish content generated by users.

Due to the ease that a user can publish content, people are currently utilizing social networking applications to distribute substantive content such as breaking news stories. For example, a user at a scene of an accident can capture the accident in an image by way of a mobile telephone, generate text that describes the accident, and post the image and text by way of a social networking application such that the content becomes available to others (e.g., the general public).

A user wishing to search over messages generated by these social networking applications, however, may be unable to ascertain whether such messages are credible. Users currently assess credibility of messages based upon trust relationships with authors whose messages they elect to follow. However, consuming these messages by way of searching for a topic rather than following an author is becoming increasingly prevalent with the introduction of search tools that are configured to search over this type of content. It can be ascertained that increased reliance on messages generated by way of social networking applications makes determining credibility of these messages a non-trivial concern.

SUMMARY

The following is a brief summary of subject matter that is described in greater detail herein. This summary is not intended to be limiting as to the scope of the claims.

Described herein are various technologies pertaining to displaying search results on a search results page are described herein. In a particular example, technologies for displaying messages generated by way of social networking applications as search results pertaining to a query are described herein. A user can indicate that they wish to search over documents generated by identifiable authors, wherein such documents can be referred to herein as "messages". Messages can include news stories, messages generated by users through utilization of social networking applications, messages generated by news services, etc. In a particular example, messages may refer to broadcasts generated by users of a broadcasting application or posts made to a public data stream by way of a social networking application.

The user can indicate that she wishes to perform a search over these types of messages. Thereafter the user can provide a search application configured to perform searches over messages with a query. The search application can execute a search over a plurality of messages and can select a subset of the plurality of messages for initial display to the user based at least in part upon the query. It is to be understood that searching over these types of messages is starkly different from performing a general web search. For example, a user performing a general web search is searching for a particular page and/or content on such page. In contrast, a user performing a search over messages generated by way of social networking applications often has no idea of a particular message or author that they wish to locate but instead is searching for general news on a topic.

In an exemplary embodiment, messages presented to the user on a graphical user interface can be selected based at least in part upon a diversity of content of such messages. For instance, social networking applications are often utilized to rebroadcast or repost certain messages made by particular authors. It may be undesirable for a user performing a search to see identical content posted by different authors on the search results page. Thus, search results selected for display to the user can be based upon diversity of content of such messages, diversity of authors of such messages, etc.

An interactive graphical object can also be presented to the user together with messages, wherein interaction with such interactive graphical object can cause search results presented to the user to dynamically alter. In a first example, the interactive graphical object can be a phrase cloud that comprises phrases that co-occur across a subset of the search results. This can inform a user of topics that are germane across the plurality messages located by the search application based at least in part upon the query issued by the user. If the user selects a phrase in the phrase cloud, then the search results can be filtered and a new subset of messages can be presented to the user based upon the selected phrase in the phrase cloud.

Another exemplary interactive graphical object can be indicative of sentiment corresponding to messages located during the search. For instance, automated message tone analyzer functionality can be employed to ascertain whether content of a message is generally positive, generally negative, or neutral. An interactive graphical object can indicate a volume of messages that have different sentiments and the user can select a desired sentiment in the interactive graphical object such that messages located during the search that have been assigned such sentiment can be presented to the user as search results.

Another exemplary interactive graphical object can be representative of geographic locations of authors of the messages located during the search. The interactive graphical object can be utilized in connection with filtering messages based upon author location, such that the issuer of the query can choose a certain location that is of interest to the issuer of the query, such as a geographic location that is proximate to the user or a geographic location that is proximate to a particular newsworthy event.

Furthermore, at least one other graphical object can be displayed to the user in connection with a message presented to the user, wherein the graphical object is indicative of credibility of the message and/or credibility of the author of the message. In an example, the graphical object can be a graphical indication of a computed credibility metric, wherein such credibility metric can be based at least in part upon a number of followers of the author, a number of messages generated by the author for a particular topic, and/or a number of rebroadcasts of messages generated by the author. Thus, by viewing such a graphical object, a user performing a search can quickly ascertain whether the message and/or author is relatively credible. This can allow the user to differentiate between a legitimate news item and spam or rumor.

Other aspects will be appreciated upon reading and understanding the attached figures and description.

DETAILED DESCRIPTION

Various technologies pertaining to presenting messages to a user that have been generated by identifiable authors will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 1:
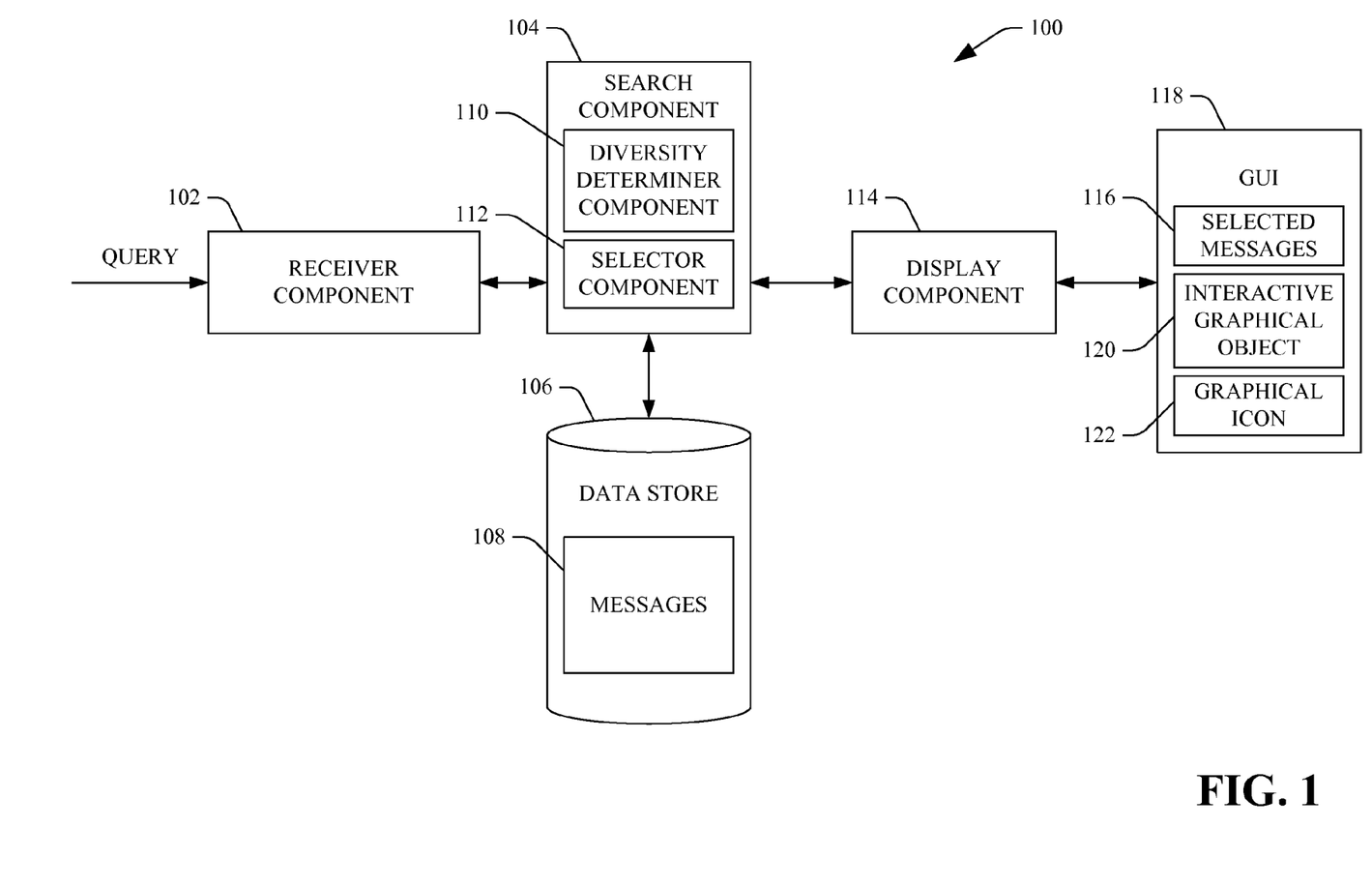
FIG. 1 is a functional block diagram of an exemplary system that facilitates presenting search results to a user together with an interactive graphical object.

With reference to FIG. 1, an exemplary system 100 that facilitates presenting search results to a user is illustrated. The system 100, in an example, can be utilized in connection with presenting documents to a user that have been generated by identifiable authors. These documents can be documents generated by news outlets, messages generated by way of social networking applications, content generated on blogs, etc. As used herein, these documents can be collectively referred to as messages. In a particular example, messages can refer solely to messages generated by users by way of a message broadcasting application and messages posted to a public data stream through use of a social networking application. An identifiable author can be an identifiable individual or an identifiable entity, such as a company or group.

The system 100 comprises a receiver component 102 that receives a query from a user, wherein the query can pertain to a particular topic. A search component 104 is in communication with the receiver component 102 and accesses a data store 106 responsive to receipt of the query. The data store 106 comprises a plurality of messages 108. The search component 104 can perform a search over the messages 108 and can output a plurality of messages based at least in part upon the received query.

The search component 104 can optionally include a diversity determiner component 110 that can determine an amount of diversity pertaining to messages output by the search component 104. For example, with respect to a particular topic, a first author may utilize a social networking application to broadcast a message on that topic. Followers (users that subscribe to receive messages generated by the author by way of the social networking application) of that author may then receive that message and rebroadcast that same message (e.g., to a publicly available data feed). Thus, for a user searching for content on a particular topic, it may be undesirable to present the user with the same content broadcast by different users of the social networking application. The diversity determiner component 110 can computer a measure of content diversity amongst the messages 108 searched over by the search component 104.

The diversity determiner component 110 can perform more granular diversity computations as well. For instance, the issuer of a query may not wish to be presented with messages generated by authors from a same geographic location. Accordingly, the diversity determiner component 110 can computer a measure of geographic diversity pertaining to authors of the messages 108. Still further, the issuer of the query may not wish to receive messages that have the same sentiment. Therefore, the diversity determiner component 110 can compute some measure of diversity of sentiment across the messages 108 searched over by the search component 104.

The search component 104 may also optionally include a selector component 112 that can select messages to present to the issuer of the query based at least in part upon the measure of diversity computed by the diversity determiner component 110. In an example, the selector component 112 can select messages for presentment to the issuer of the query that have relatively diverse contents with respect to the topic being searched by the issuer of the query, have relatively diverse sentiment, and are generated by authors that are relatively geographically diverse. The issuer of the query may indicate ahead of time an amount of diversity and type of diversity that they wish to have computed when selecting messages for presentment to the issuer of the query.

A display component 114 can receive the messages selected by the selector component 112 and can cause these selected messages 116 to be displayed to the issuer of the query in a graphical user interface 118. Together with the selected messages 116, the display component 114 can cause at least one of an interactive graphical object 120 or another graphical object 122 to be presented to the issuer of the query in the graphical user interface 118. The interactive graphical object 120 can be indicative of content of messages located by the search component 104 across such messages. Thus, for instance, the interactive graphical object 120 can be indicative of other topics discussed in related messages, sentiments of documents in the messages retrieved by the search component 104, etc. Furthermore, the issuer of the query can interact with at least a portion of the interactive graphical object 120, wherein an interaction with the interactive graphical object 120 can cause the selected messages 116 presented to the user to change. Additionally, upon interaction with the interactive object 120, the interactive object itself can change.

Various exemplary implementations of the interactive graphical objects 120 will be described in detail below.

The graphical object 122 can be representative of a computed credibility of at least one of the selected messages 116 presented to the user and/or credibility of at least one author of the at least one of the selected messages 116. For example, if the messages 108 include messages generated by way of social networking applications, the issuer of the query may have no relationship with the authors of the messages and thus be uncertain as to the credibility of such messages. The graphical object 122 can provide the issuer of the query with some information pertaining to creditability of the messages and/or credibility of the authors. This credibility can be computed in a variety of manners. For instance, the credibility can be computed based at least in part upon a number of subscribers to messages broadcast by the particular author. In another example, a computed credibility can be based at least in part upon a number of messages generated by the author on a topic that is germane to the query. In still yet another example, the computed credibility can be based at least in part upon a number of times that messages generated by the author have been rebroadcast or reposted by other users of social networking applications. Other factors for consideration when computing a credibility of a message and/or author may be recognized by one of ordinary skill in the art and are intended to fall under the scope of the hereto appended claims.

Figure 2:
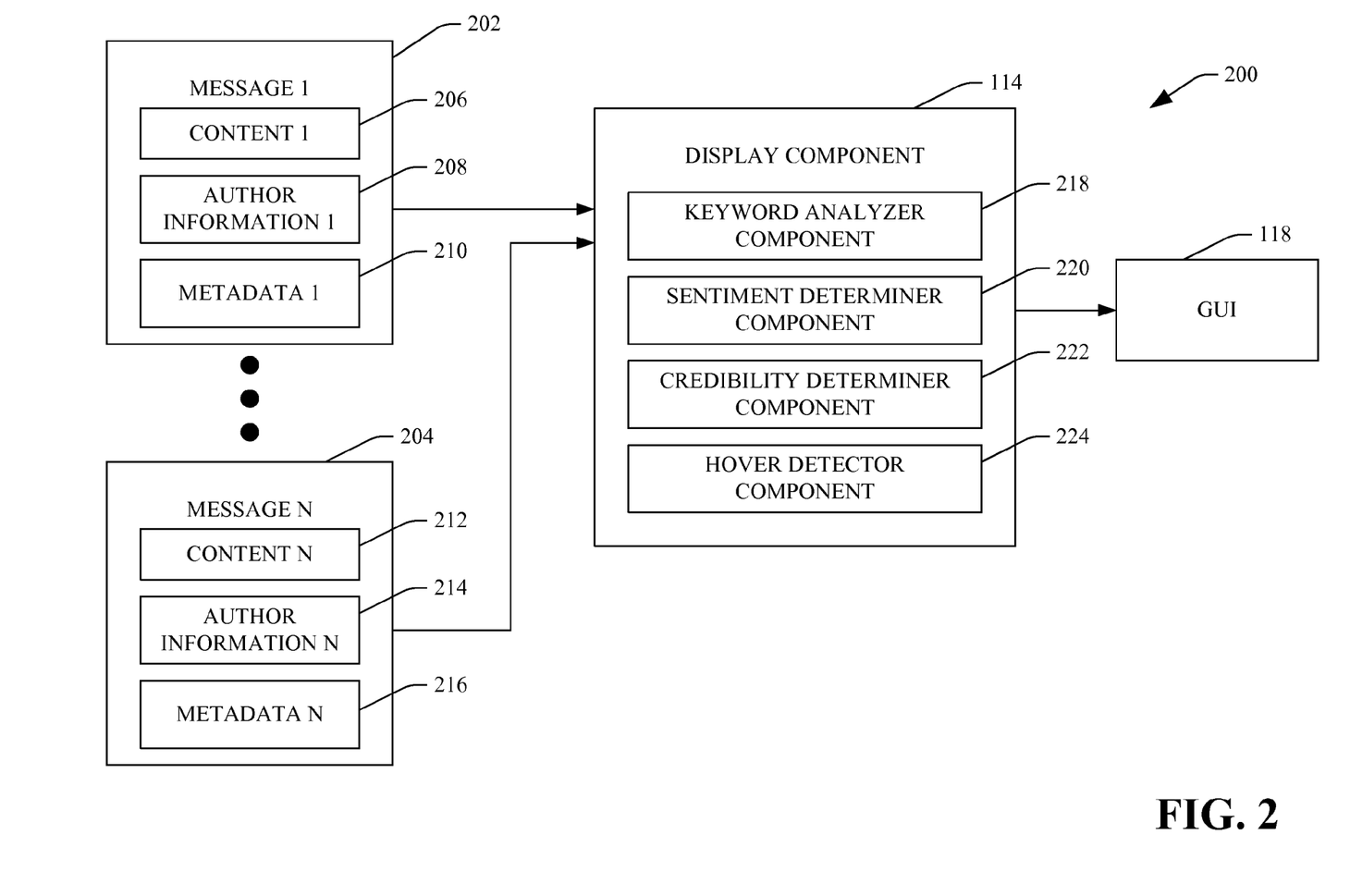
FIG. 2 is a functional block diagram of an exemplary system that facilitates displaying search results to a user.

With reference now to FIG. 2, an exemplary system 200 that facilitates presenting search results to a user together with one or more graphical objects that pertain to the search results is illustrated. The system 200 comprises the display component 114 that is configured to present messages to the user in the graphical user interface 118 together with the interactive graphical object 120 and/or the graphical object 122 (FIG. 1). As indicated above, the display component 114 can receive a plurality of messages 202-204, wherein such messages 202-204 have been located by the search component 104 as being germane to the query issued by the user. It is to be understood, however, that not all of the messages 202-204 may be presented to the user. The first message 202 can comprise first content 206, first author information 208, and first metadata 210. The first content 206 can be text or images in the first message 202 generated by a particular author. The first author information 208 can include identity of the author, an image of the author, a biography of the author, etc. The first metadata 210 can comprise information pertaining to the first content 206 and/or the first author. For instance, the first metadata 210 can include information pertaining to location of the author, information pertaining to a social networking application utilized to generate the first content 206, a URL corresponding to such first content 206, a number of posts generated by the author with respect to a topic pertaining to the first content 206, a number of subscribers or contacts of the author in a social networking application, a number of times that the first content 206 has been redistributed by other individuals using a social networking application, amongst other metadata. Similarly the Nth message 204 can include Nth content 212, Nth author information 214, and Nth metadata 216.

The display component 114 can receive and analyze these messages 202-204 in connection with presenting a subset of the messages 202-204 to the user as well as to present the interactive graphical object 120 and/or the graphical object 122 to the user. For example, the display component 114 may comprise a keyword analyzer component 218 that can search the first content 206 through the Nth content 212 of the search results 202-204 for various keywords or phrases that co-occur across messages located by the search component 104.

Figure 3:
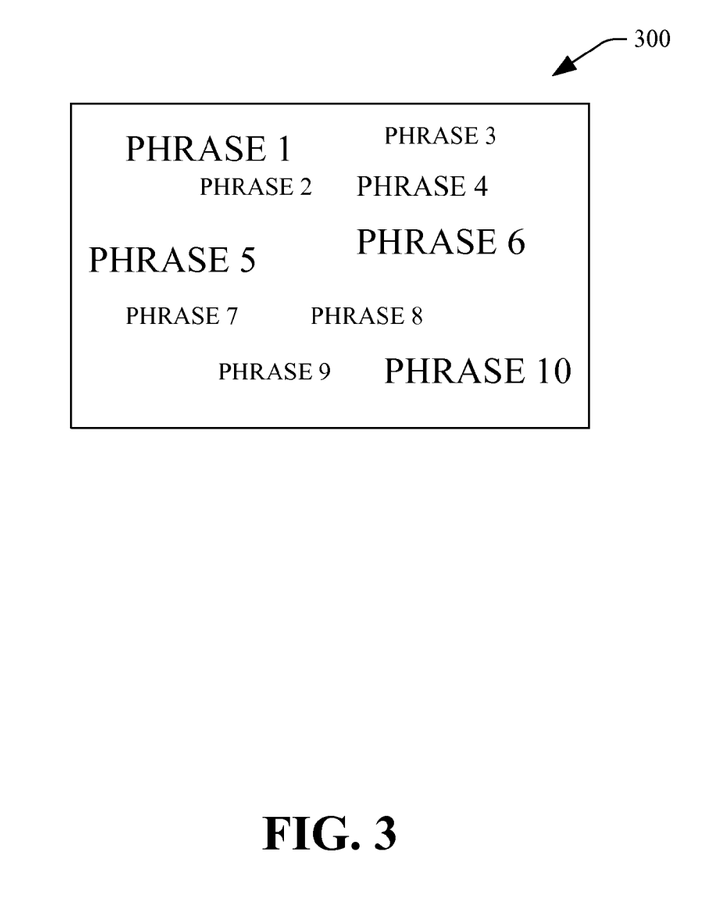
FIG. 3 is an exemplary word cloud.

Turning briefly to FIG. 3, an exemplary phrase cloud 300 is illustrated. The phrase cloud 300 comprises multiple phrases that co-occur across at least some of the messages 202-204, wherein such phrases were not included in the initial query issued by the user. Thus, these phrases may indicate other topics that are being discussed in the messages retrieved by the search component 104. In the exemplary phrase cloud 300 shown in FIG. 3, a size pertaining to a phrase in such phrase cloud 300 can be indicative of a number of messages in the messages 202-204 that include the phrase (an amount of co-occurrence of the phrase across the messages 202-204). Thus, the first phrase co-occurs more often in the search results 202-204 than the second phrase.

This phrase cloud 300 can be presented on the graphical user interface as the interactive graphical object 120, such that the issuer of the query can select one or more of the phrases in the phrase cloud 300. Responsive to user selection of one of these phrases, the search results located by the search component 104 can be filtered using the query initially issued by the user in combination with the phrase selected in the phrase cloud 300. Alternatively, these phrases may be suggested or alternate query such that a new search is conducted upon user selection of one of the phrases in the phrase cloud 300. The new search, then, is based at least in part upon the phrase selected by the user from the phrase cloud 300, and updated search results can be dynamically presented to the user on the graphical user interface 118.

Returning to FIG. 2, the display component 114 can additionally comprise a sentiment determiner component 220 that can determine a sentiment corresponding to each of the messages 202-204. For instance, the sentiment determiner component 220 can utilize any suitable language/tone analysis technique to determine a sentiment corresponding to a message. In an example, the sentiment determiner component 220 can analyze first content 206 in the message 202 and determine that the first content 206 includes generally positive language. Accordingly, the sentiment determiner component 220 can determine that the sentiment of the message 202 is positive. In contrast, the sentiment determiner component 220 can analyze the Nth content 212 of the Nth message 204 and can determine that language utilized in such message 204 is generally negative. Accordingly, the sentiment determiner component 220 can indicate that the sentiment of the message 204 is negative. In yet another example, the sentiment determiner component 220 can analyze content of a different message and determine that the sentiment is relatively neutral (i.e., neither positive nor negative). It is to be understood that the sentiment determiner component 220 can determine sentiment with respect to any suitable metrics or parameters. For example, the sentiment determiner component 220 can determine political nature of search results (e.g., democratic or republican). It can therefore be ascertained that the sentiment determiner component 220 can determine a variety of sentiments with respect to the messages 202-204. Additionally, the display component 114 can display the interactive graphical object 120 in the graphical user interface 118 based at least in part upon sentiment corresponding to the messages 202-204 determined by the sentiment determiner component 220.

Figure 4:
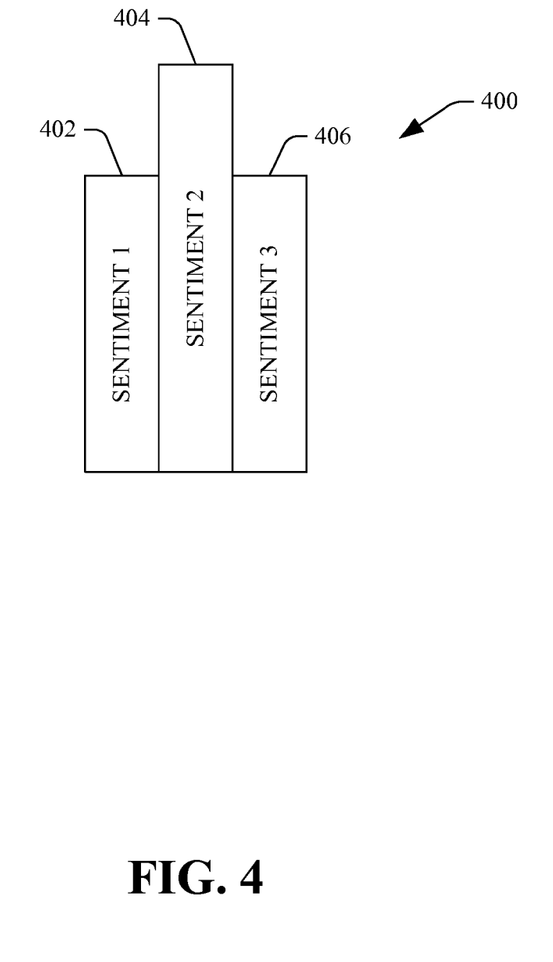
FIG. 4 is an exemplary interactive graphical object that allows filtering of search results by sentiment.

Referring briefly to FIG. 4, an exemplary interactive graphical object 400 that can be presented in the graphical user interface 118 is shown. For example, the interactive graphical object 400 can enable the issuer of the query to filter messages based at least in part upon sentiment determined by the sentiment determiner component 220. As shown, the interactive graphical object 400 can be a bar chart that comprises three separate columns 402, 404 and 406, wherein such columns can indicate sentiment corresponding to messages retrieved by the search component 104 with respect to a volume of messages retrieved by the search component 104. For instance, the first column 402 can indicate that a certain volume of retrieved messages have a first sentiment corresponding thereto (e.g., positive). Similarly, the second column 404 can indicate that a greater number of retrieved messages are of the second sentiment than retrieved messages that are or the first sentiment. For instance, if the second sentiment is negative, the issuer of the query can quickly ascertain that more retrieved messages have been assigned a negative sentiment than a positive sentiment. Similarly, the third column 406 can indicate a certain volume of retrieved messages that have a third sentiment. The issuer of the query may select any one of the columns 402-406, which can cause messages to be filtered based at least in part upon sentiment of such messages as determined by the sentiment determiner component 220. Thus, if the issuer of the query selected the second column 404, then messages retrieved by the search component 104 based at least in part upon the query issued by the user that are of the second sentiment can be presented to the user in the graphical user interface 118.

Figure 5:
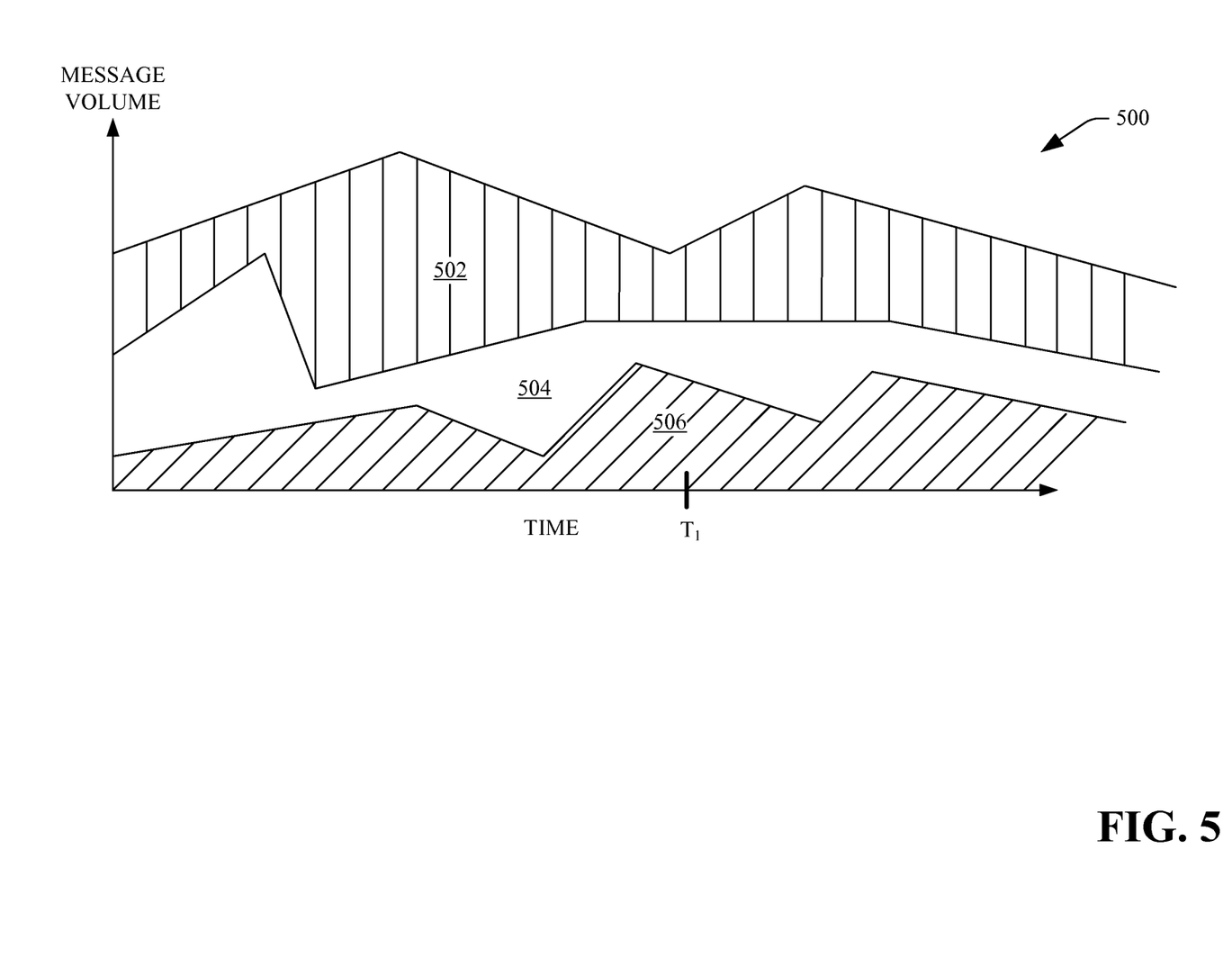
FIG. 5 is an exemplary interactive graphical object that allows filtering of search results by way of time and message sentiment.

Referring now to FIG. 5, another exemplary interactive graphical object 500 that can be displayed in the graphical user interface 118 is illustrated. Again, the interactive object 500 can indicate to the issuer of the query the volume of retrieved messages that have been assigned certain sentiments as determined by the sentiment determiner component 220. Additionally, the interactive graphical object 500 can indicate a volume of retrieved messages with varying assigned sentiments with respect to time. The interactive graphical object 500 can comprise a first region 502 that corresponds to a first sentiment, a second region 504 that corresponds to a second sentiment, and a third region 506 that corresponds to a third sentiment. If the issuer of the query wishes to filter retrieved messages based upon sentiments corresponding to such messages, then the issuer of the query can select one of the portions 502, 504 or 506 of the interactive graphical object 500. This can cause retrieved messages to be filtered based at least in part upon the selection of one of the portions 502, 504 or 506.

Additionally, the issuer of a query may wish to filter retrieved messages based on sentiment and time. Thus, for instance, the issuer of the query may first select a portion of the interactive graphical object 500 that corresponds to a certain date or time, and may thereafter select a region or portion of the interactive graphical object 500 that corresponds to a particular sentiment. As shown in the interactive graphical object 500, the issuer of the query can first select a tick mark corresponding to a time $T_1$ and may thereafter select the region 502 of the interactive graphical object 500. This can cause retrieved messages generated at times $T_1$ (a certain day) that have a particular sentiment assigned thereto by the sentiment determiner component 220 to be presented to the user on the graphical user interface 118. Other mechanisms for utilizing such an interactive graphical object 500 to filter messages based at least in part upon time and sentiment are contemplated and are intended to fall under the scope of the hereto-appended claims.

Figure 6:
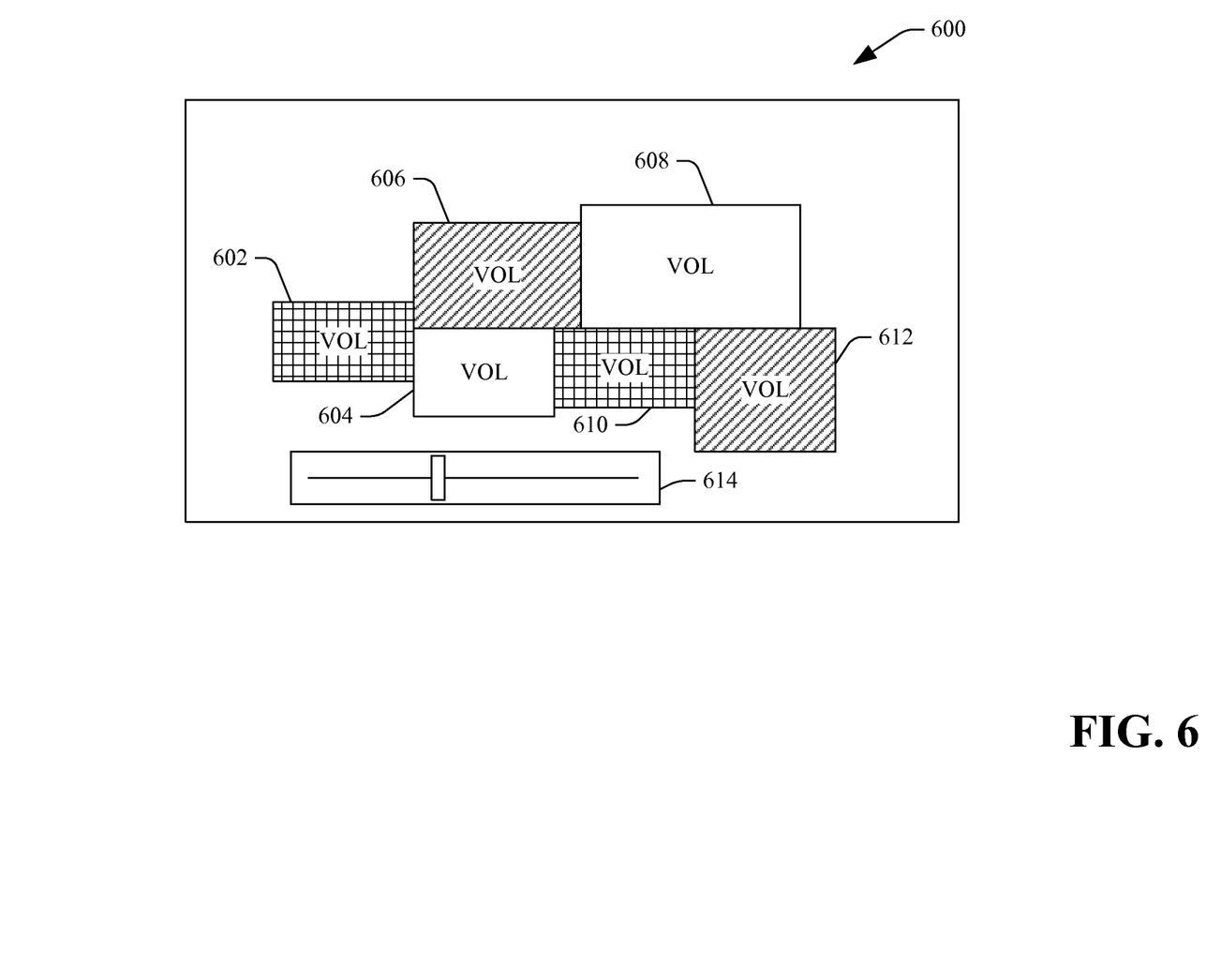
FIG. 6 is an interactive graphical object which illustrates search results pertaining to geographic locations.

Now referring to FIG. 6, yet another exemplary interactive graphical object 600 that can be displayed in the graphical user interface 118 together with retrieved message pertaining to a query is illustrated. The interactive graphical object 600, in an example, can be a map that comprises a plurality of different geographic regions 602-612. These geographic regions 602-612 can be, for example, cities, counties, townships, states, countries, etc. The geographic regions 602-612 represented in the map can be assigned certain colors or shaded in particular manners to indicate a sentiment of messages corresponding to the geographic regions 602-612. Additionally, multiple colored regions can be assigned to each of the geographic regions 602-612 to illustrate distribution of sentiment of messages for the geographic regions 602-612. For example, with respect to a topic pertaining to the query issued by the user, the geographic regions 602 and 610 can generally be associated with authors that generate messages with a first sentiment; the geographic regions 604 and 608 can generally be associated with messages that have a second sentiment; and a geographic region 606 and 612 can have messages that generally have a third sentiment. Still further, each geographic region can have text or some other data corresponding thereto that indicates a volume of messages pertaining to the query corresponding to the particular geographic region 602-612. Such volume can be useful to the issuer of query if the issuer of the query wishes to see how many messages are generated at different geographic locations.

The issuer of the query can interact with the interactive graphical object 600 by selecting on one or more of the geographic regions and/or particular portions of such geographic regions 602-612 to filter messages based on geography and sentiment. Therefore, if the issuer of the query wished to see only messages generated from the geographic region 608 that have a positive sentiment, the issuer of the query can select a particular portion of the geographic region 608 corresponding to messages with positive sentiment, and updated search results (messages) can be provided to the issuer of the query responsive to such selection. Additionally, the interactive graphical object 600 can include a slider 614 that allows the issuer of the query to filter messages based upon a selected time. Therefore, for instance, the issuer of the query can first select a particular portion of a geographic region representative of a map and then may move the slider 614 to a time that is of interest to the issuer of the query. Thereafter, messages pertaining to such geographic region, sentiment, and time can be presented to the user.

Referring back to FIG. 2, the display component 114 can also comprise a credibility determiner component 222 that can compute a credibility metric pertaining to a message based at least in part upon a variety of factors. These factors can include user ratings assigned to an author of the message, a number of individuals that have subscribed to receive messages broadcast by the author, a number of messages generated by the author on a particular topic that is germane to the query, whether the author of the message has been authenticated or in some way endorsed by a particular social networking application, amongst various other factors.

Other factors that can be utilized by the credibility determiner component 222 when computing a credibility metric can include, for example, a number of network hops (in the social network of the user and contacts of the user) that connect the author of a message the querier, or factors outside the social networking system such as information about the author obtained from other web pages. This information can include a number of articles credited to the author available on other web pages, tone/sentiment of articles posed by the author on other web pages, etc. Still further, the credibility metric computed by the credibility determiner component 222 can be personalized for the user based at least in part upon the user's past searching and web browsing history. For example, if the user frequently reads articles from a newspaper online, then the credibility determiner component 222 can output a relatively high credibility metric for messages generated by authors from the newspaper. The display component 114 may then cause the graphical object 122 to be displayed to the user to indicate creditability of the message determined by the credibility determiner component 222.

Figure 7:
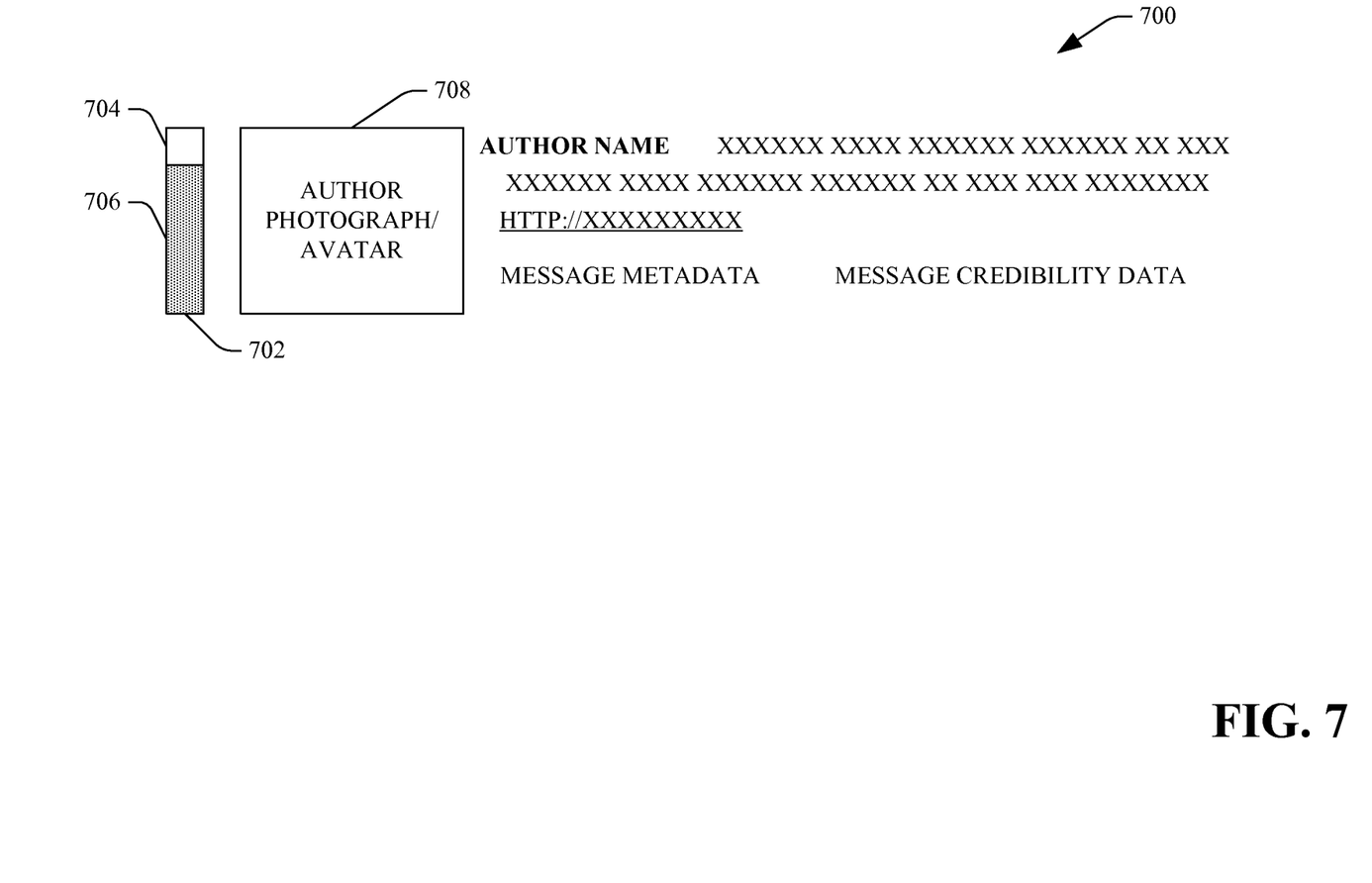
FIG. 7 illustrates an exemplary search result together with a graphical object that indicates credibility of such search result.

With reference now to FIG. 7, an exemplary message 700 that can be presented to the user in the graphical user interface 118 is illustrated, wherein the message 700 includes a graphical object that is indicative of credibility of the message. For example, the graphical object 122 can be implemented as a temperature gauge 702, wherein the temperature gauge 702 indicates a credibility of the message 700 and/or the author of the message 700. For instance, the temperature gauge 702 can comprise a first portion 704 and a second portion 706, wherein the more space or area of the temperature gauge 702 that is occupied by the second portion 706, the more credible the message 700 and/or the more credible the author of the message 700.

The message 700 can additionally comprise an author photograph and/or an avatar 708 that is representative of the author. The message 700 can further comprise an author name, at least a snapshot (summary) of the content of the message 700, message metadata and/or message credibility data. Additionally, the message 700 can comprise a URL that indicates where on the World Wide Web the message 700 can be located. The message metadata can include information such as a time that the message 700 was generated, a location corresponding to an author of the message 700, amongst other data. The message credibility data can indicate a number of subscribers to messages generated by the author of such message 700, data pertaining to whether the author has been authenticated or endorsed by a particular social networking application used to generate the message 700, etc. Of course there are other manners or mechanisms other than the temperature gauge 702 to indicate credibility of the message, such as a star rating system, where a greater number of stars assigned to the message, the more credible the message, or other graphical objects that can be used to indicate credibility of a message.

With reference again to FIG. 2, the display component 114 can comprise a hover detector component 224 that can sense when a user is hovering over a portion of a message (e.g., through utilization of a mouse pointer), such as the message 700. For example, the user can hover over the temperature gauge 702, the content of the message 700, the author photo/avatar 708, etc. Upon the hover detector component 224 determining that the issuer of the query is hovering over a particular portion of a message, the display component 114 can cause a graphical object indicative of credibility of the message and/or author to be presented to the user.

Figure 8:
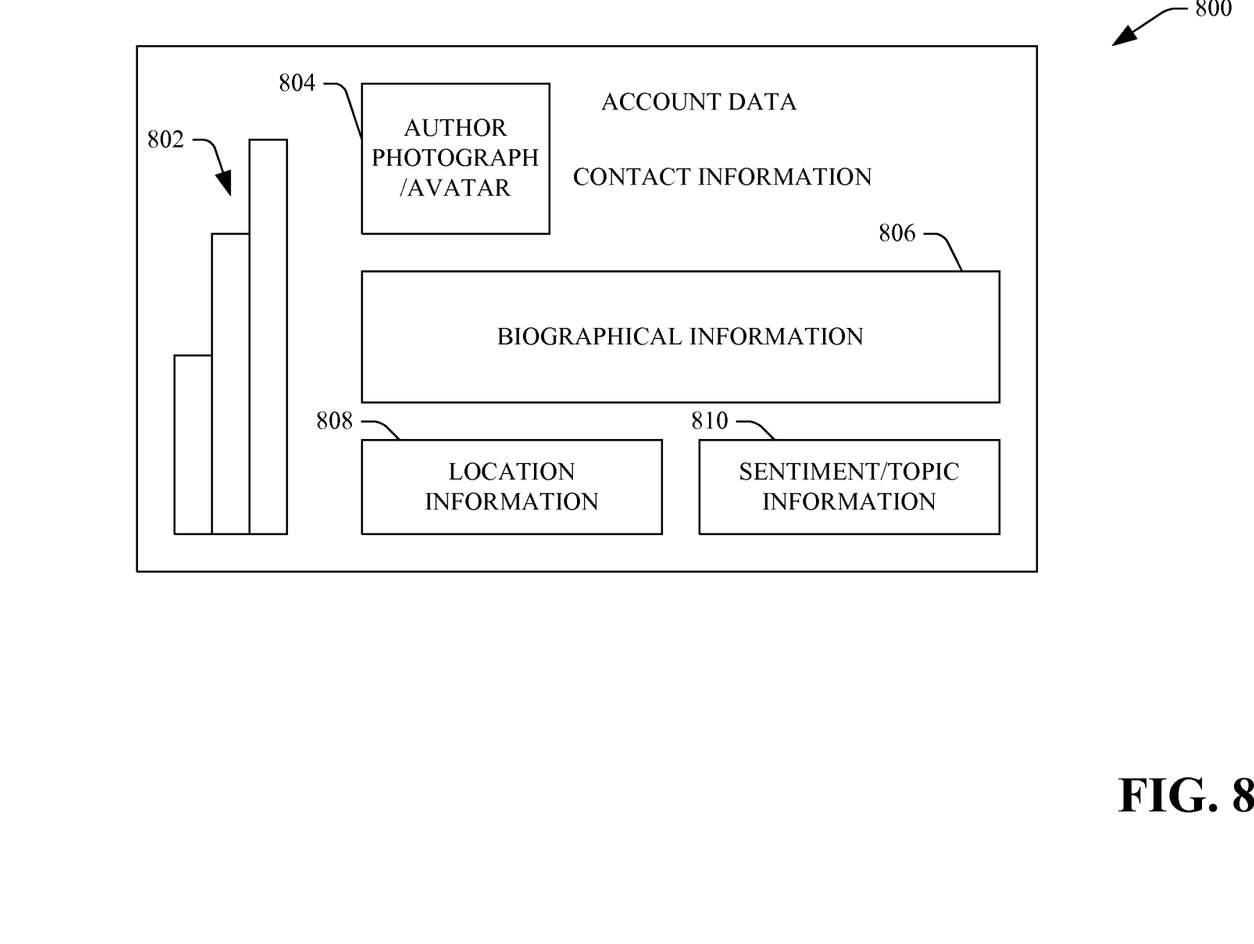
FIG. 8 is an exemplary graphical user interface that comprises information indicative of credibility of a message.

Now referring to FIG. 8, a graphical user interface 800 that can be displayed to the user in the graphical user interface 118 together with message germane to a query is illustrated. The graphical user interface 800 can be displayed to the user upon the hover detector component 224 detecting that the user is hovering over at least a portion of a message presented to the user in the graphical user interface 118. The graphical user interface 800 can include, for example, a graphical indicia 802 that indicate factors utilized to compute the measure of credibility of the message and/or the measure of credibility of the author of the message. In this example, the graphical indicia 802 is shown to be a bar chart that comprises a plurality of different columns wherein, for instance, a first column can indicate a number of followers of the author (subscribers to messages generated by the author), a second column can indicate a number of messages by the author that are rebroadcast by others, and the third column can indicate, for instance, a number of messages generated by the author on the topic pertaining to the query. Other factors can be utilized to compute the measure of credibility and other graphical indicia, such as pie charts, numerical values, etc. can be utilized to depict different factors utilized when computing the measure of credibility of a message.

The graphical user interface 800 can further comprise author account data, such as data that indicates a type of social networking application used to generate the message as well as contact information of the author, which may be e-mail address, home page of the author, etc.

The graphical user interface 800 may further comprise biographical information 806 pertaining to the author, wherein such biographical information 806 can be retrieved from the social networking account utilized to generate the message, scraped from the World Wide Web, or obtained from any other suitable means. The graphical user interface 800 may further comprise location information 808 that indicates a location of the author of the message. This location information 808 can be textual, may be shown in the form of a map, etc. The graphical user interface 800 can further comprise sentiment/topic information 810. This sentiment/topic information 810 can indicate a general sentiment of messages published by the author of such message and/or a topical distribution of messages generated by such author. Accordingly, by hovering over a message, the issuer of the query can quickly ascertain a significant amount of information about the author of such message, which can be indicative of credibility of the author and thus credibility of the message itself.

Figure 9:
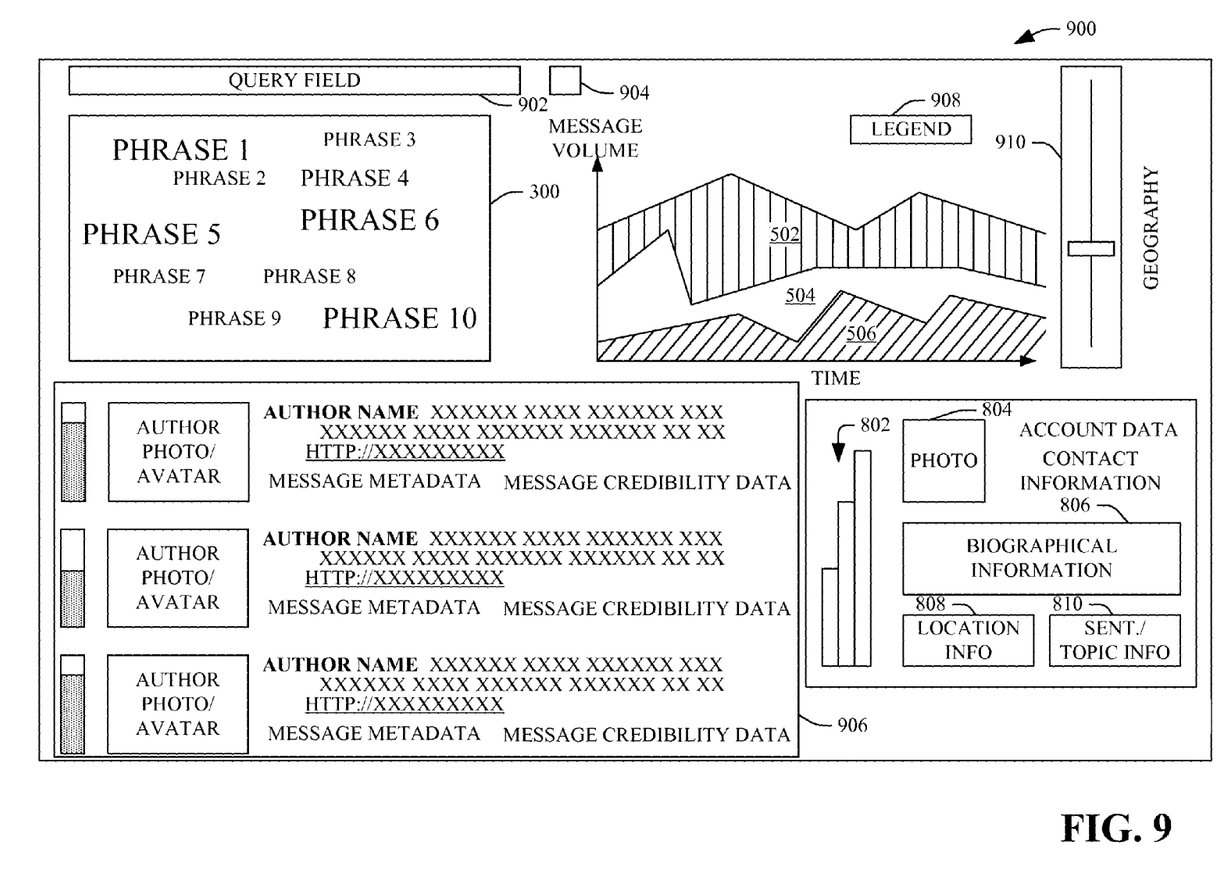
FIG. 9 is an exemplary graphical user interface that displays search results together with interactive graphical objects.

Turning now to FIG. 9, an exemplary implementation 900 of the graphical user interface 118 is presented. The graphical user interface 118 can comprise a query field 902 that is configured to receive a query from a user. The graphical user interface 118 can further comprise a push button 904, wherein depression of the push button 904 subsequent to the user issuing a query to the query field 902 can cause messages to be searched over utilizing such query. Subsequent to a user issuing a query, the graphical user interface 118 can comprise a search results field 906 that includes a plurality of messages such as message 700 shown in FIG. 7. These messages can be a subset of messages that are found to be relevant to a query issued by the user. For instance, the search component 104 (FIG. 1) can determine that the messages included in the search results field 906 are the most relevant messages to the query issued by the user. Other search results, however, may be relevant to a query and may not be displayed due to lack of screen real estate.

If the user hovers over a particular portion of one of the messages depicted in the search results field 906, then the graphical user interface 800 can be presented to the user, wherein such graphical user interface 800 displays data pertaining to the author and/or message hovered over by the user.

The graphical user interface 118 can further include the phrase cloud 300 that presents to the user phrases that co-occur across messages located by the search component 104. The user may select one of the phrases shown in the phrase cloud 300, which can cause messages in the search results field 906 to be dynamically updated based at least in part upon the phrase in the phrase cloud 300 selected by the user. As indicated above, selection of a phrase may cause an entirely new search to be performed or can be utilized to filter messages previously located by the search component 104.

The graphical user interface 118 may also comprise the interactive graphical object 500, wherein such interactive graphical object 500 can indicate different sentiments corresponding to messages retrieved by the search component 104. As described above, the volume of messages with various sentiments can be displayed with respect to time, such that through interaction with the interactive graphical object 500 the user can choose to be provided with messages of a particular sentiment and/or messages generated at particular periods of time. The interactive graphical object 500 can have a legend 908 corresponding thereto that indicates to the user which of the portions of the interactive graphical object 500 correspond to which sentiment.

Still further, the graphical user interface 118 can include a slider 910 that allows the user to filter messages based upon geography corresponding to such search results. For instance, a top of the slider 910 may restrict messages presented to the user to a particular locality while a bottom of the slider 910 may allow messages from a larger geographic region to be presented to the user. If the user chooses to alter position of the slider 910, then the content depicted in the interactive graphical object 500 can dynamically alter and messages presented in the search results field 906 can dynamically update based at least in part upon a geography selected by the user.

Figure 10:
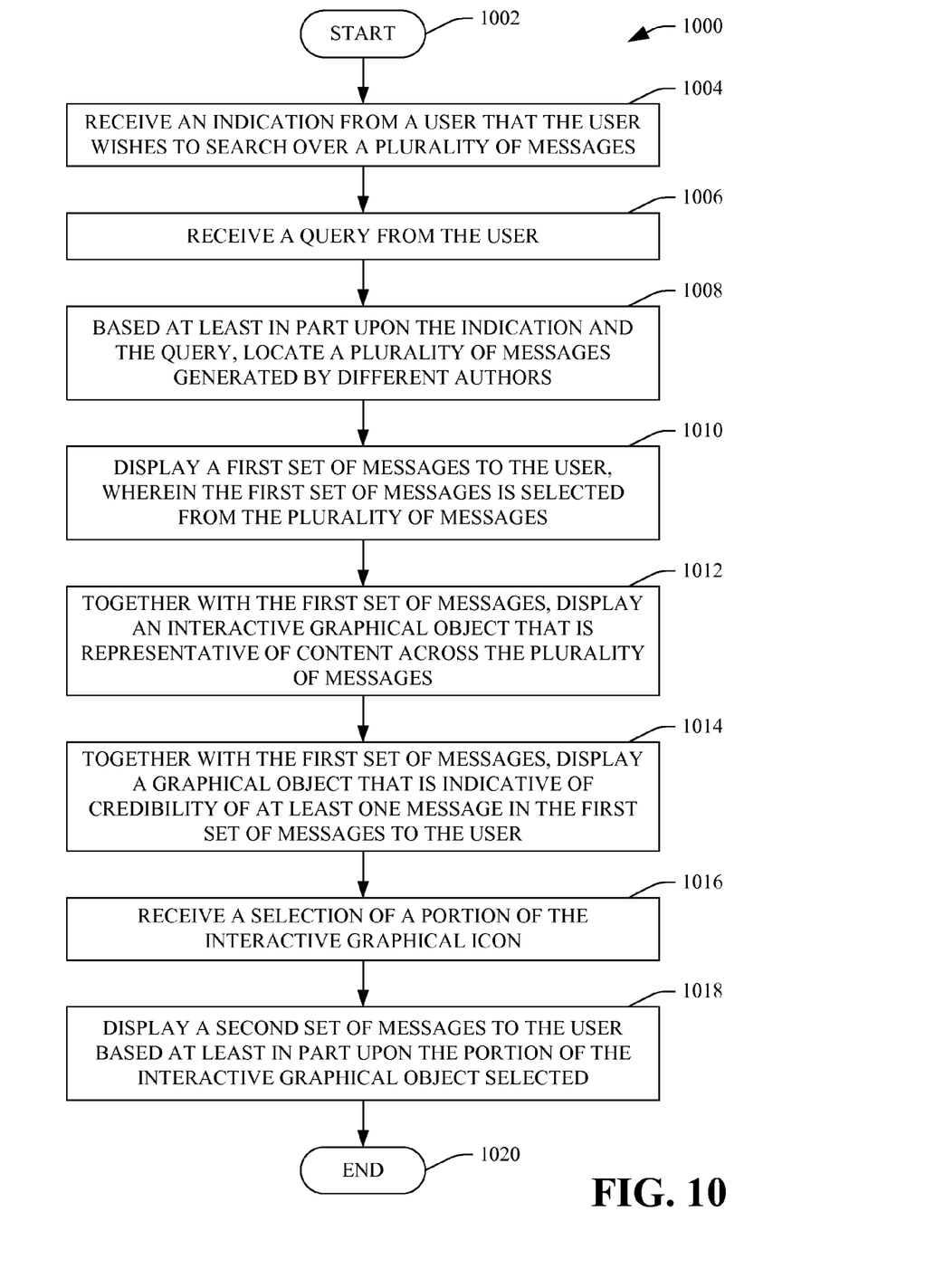
FIG. 10 is a flow diagram that illustrates an exemplary methodology for displaying search results to a user together with graphical objects.

With reference now to FIG. 10, an exemplary methodology 1000 is illustrated and described. While the methodology 1000 is described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodology may be stored in a computer-readable medium, displayed on a display device, and/or the like. The computer-readable medium may be a non-transitory medium, such as memory, hard drive, CD, DVD, flash drive, or the like.

The methodology 1000 shown in FIG. 10 facilitates presenting an interactive search results page to a user, wherein the search results page displays messages or content generated by way of identifiable authors. The methodology 1000 begins at 1002, and at 1004 an indication is received from a user that the user wishes to search over a plurality of messages. For example, the user can select a particular vertical in a general purpose search engine to indicate that they wish to search over messages generated by way of social networking applications. In another example, the user may direct a browser to a URL corresponding to a search portal that is configured to search over messages with identifiable authors.

At 1006, a query is received from the user. This query can be received by way of a text entry field in a search engine, through voice analysis, etc. At 1008, based at least in part upon the indication received at 1004 and the query received at 1006, a plurality of messages are located, wherein such plurality of messages are generated by different authors.

At 1010, a first set of messages is displayed to the user, wherein the first set of messages is selected from the plurality of messages located at 1008. For instance, the first set of messages can be selected based at least in part upon diversity of contents of messages in the first set of messages, diversity of authors of messages in the first set of messages, etc. Therefore, the first set of messages can comprise messages that are believed to be most relevant to the informational intent of the user.

At 1012, an interactive graphical object is displayed together with the first set of messages, wherein the interactive graphical object is representative of content across the plurality of messages located at 1008. Accordingly, the interactive graphical object can indicate phrases that co-occur across messages in the plurality of messages located at 1008, can indicate sentiment across messages in the plurality of messages located at 1008, etc.

At 1014, a graphical object is displayed that is indicative of credibility of at least one message in the first set of messages. This graphical object is displayed together with the first set of messages and the interactive graphical object. For instance, the graphical icon can be a temperature gauge that illustrates credibility of an author and/or message shown to the user, can be a star rating system that indicates credibility of an author and/or message presented to the user, etc.

At 1016, a selection of a portion of the interactive graphical object is received. For instance, the user may select a phrase that co-occurs across the plurality of messages located at 1008. In another example, the user can select a particular sentiment of messages that occur in the plurality of messages located at 1008, etc.

At 1018, a second set of messages is displayed to the user based at least in part upon the portion of the interactive graphical object selected by the user at 1016. Thus, for instance, if the user selected a portion of the interactive graphical object that corresponded to a particular sentiment, then only messages that have such sentiment can be presented to the user. The methodology 1000 completes at 1020.

Figure 11:
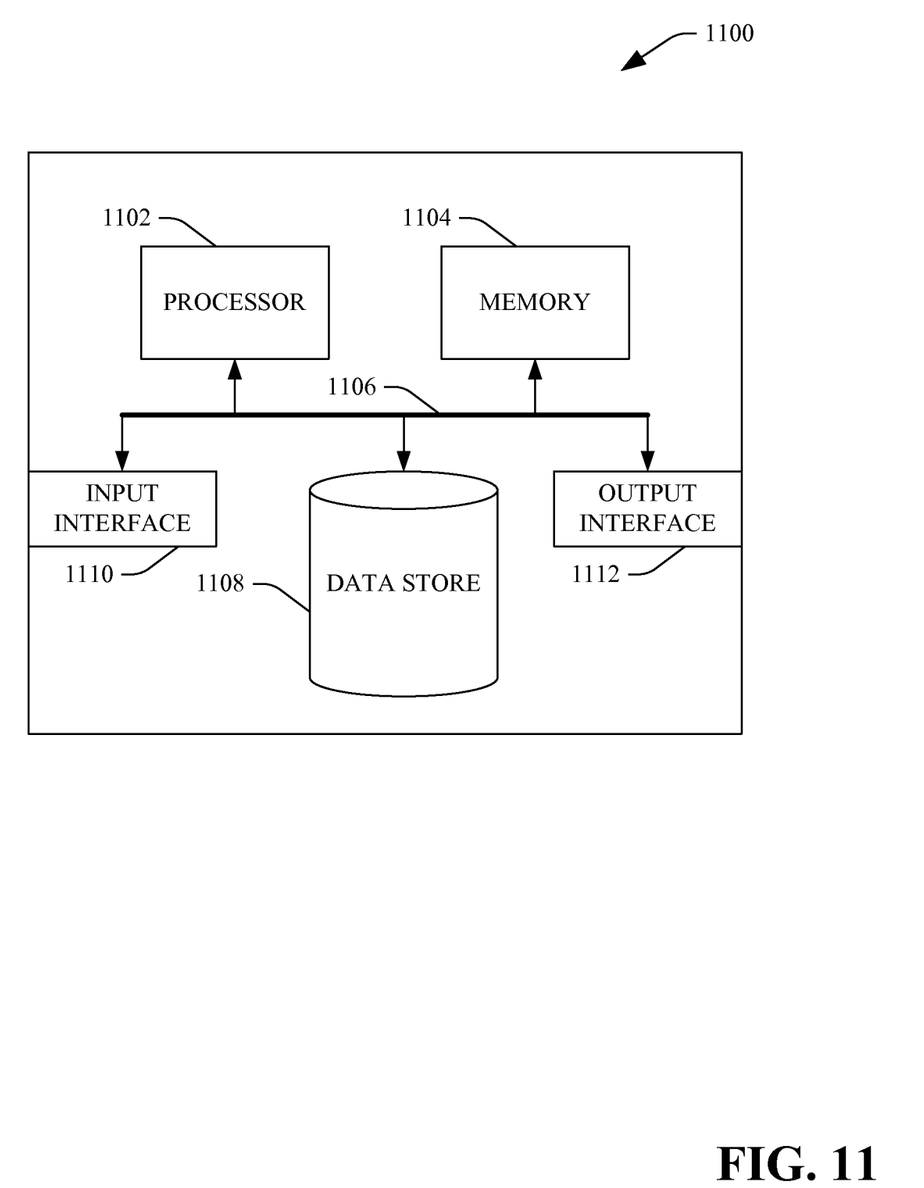
FIG. 11 is an exemplary computing system.

Now referring to FIG. 11, a high-level illustration of an exemplary computing device 1100 that can be used in accordance with the systems and methodologies disclosed herein is illustrated. For instance, the computing device 1100 may be used in a system that supports searching over messages generated by way of social networking applications. In another example, at least a portion of the computing device 1100 may be used in a system that supports presenting interactive graphical objects to users that allow users to dynamically update search results. The computing device 1100 includes at least one processor 1102 that executes instructions that are stored in a memory 1104. The memory 1104 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store messages, data pertaining to authors, etc.

The computing device 1100 additionally includes a data store 1108 that is accessible by the processor 1102 by way of the system bus 1106. The data store 1108 may be or include any suitable computer-readable storage, including a hard disk, memory, etc. The data store 1108 may include executable instructions, messages that can be searched over by a user, authors pertaining to such messages, metadata pertaining to such messages, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system comprising:
   a processor; and
   memory that stores instructions that, when executed by the processor, cause the processor to perform acts:
   receiving a query for performing a search over a data repository that comprises messages broadcast by way of a message broadcasting social networking application, at least some of the messages being rebroadcast by way of the message broadcasting social networking application, each message in the messages comprising message content and an identifiable author;
   performing a search over the messages to output a plurality of messages based upon the query;
   causing a first set of messages from the plurality of messages to be displayed;
   causing an interactive graphical object to be displayed together with the first set of messages, the interactive graphical object being representative of content of the plurality of messages; and
   in response to receipt of a selection of a portion of the interactive graphical object, refining the search and outputting a second set of messages from the plurality of messages, the search refined based upon the selection of the portion of the interactive graphical object.

2. The system of claim 1, the acts further comprising selecting the first set of messages from the plurality of messages based upon at least one of:
   an amount of diversity between content of messages in the plurality of messages;
   an amount of diversity in sentiment across the messages in the plurality of messages; or
   an amount of diversity across features of authors of the messages in the plurality of messages.

3. The system of claim 1, the acts further comprising:
   locating phrases that co-occur across messages in the plurality of messages, wherein the interactive graphical object is a phrase cloud that depicts the phrases that co-occur across the messages in the plurality of messages; and
   responsive to receipt of a selection of a phrase in the phrase cloud, filtering the plurality of messages based upon the phrase.

4. The system of claim 1, the acts further comprising:
   determining a sentiment for each message in the plurality of messages based upon content of the messages, and wherein the interactive graphical object comprises indications of sentiment of messages in the plurality of messages and
   responsive to receipt of a selection of a particular sentiment represented in the interactive graphical object, filtering the plurality of messages based at least in part upon the particular sentiment.

5. The system of claim 4, wherein the interactive graphical object is representative of volume of messages with respect to time and sentiment.

6. The system of claim 4, wherein the interactive graphical object is representative of volume of messages with respect to geographic region and sentiment.

7. The system of claim 4, wherein the interactive graphical object is representative of volume of messages with respect to time, geographic region, and sentiment.

8. The system of claim 1, the acts further comprising causing a graphical object that is representative of a computed credibility of at least one author of a message in the plurality of messages to be displayed simultaneously with the interactive graphical object.

9. The system of claim 1, the acts further comprising determining a measure of credibility pertaining to at least one displayed message based upon:
   a number of messages generated by an author of the at least one message on a topic of the at least one message;
   a number of subscribers or contacts of the author in a social networking application utilized to generate the at least one message; and
   a number of rebroadcasts of messages generated by the author; and
   causing a graphical object that is indicative of credibility of the author to be displayed in conjunction with the at least one message.

10. The system of claim 1, the acts further comprising:
    determining that a user is utilizing a mouse pointer to hover over at least one message; and
    determining that the user is utilizing the mouse pointer to hover over the at least one message, displaying biographical information for the at least one author.

11. The system of claim 10, wherein the biographical information comprises:
    location of the at least one author;
    a number of messages generated by the at least one author through utilization of a social networking application;
    a number of followers of the at least one author; and
    graphical indicia of sentiment of messages generated by the at least one author.

12. A method comprising,
    receiving a query from a user;
    searching over a plurality of messages generated by way of one or more social networking applications based at least in part upon the query;
    locating a subset of the plurality of messages based at least in part upon the searching; and
    displaying the subset of messages to the user together with graphical objects that are indicative of respective computed credibility of messages in the subset of messages, wherein the computed credibility of a message is based at least in part upon a number of followers of an author of the message, a number of messages generated by the author of the message, and a number of redistributions of messages generated by the author.

13. The method of claim 12, wherein the messages are broadcasts generated by authors by way of a message broadcasting application.

14. The method of claim 12, wherein the messages are posted by authors to public data streams of a social networking application.

15. The method of claim 12, further comprising displaying an interactive graphical object simultaneously with the subset of messages, wherein interaction with the interactive graphical object causes messages presented to the user to alter.

16. The method of claim 15, wherein the interactive graphical object comprises selectable phrases, wherein selection of a selectable phrase causes the messages to be filtered based at last in part upon the selectable phrase.

17. The method of claim 15, wherein the interactive graphical object comprises a selectable map that indicates message volume by geographic location, wherein selection of a portion of the map causes the messages to be filtered based upon a geographic location corresponding to the portion of the map.

18. The method of claim 12, wherein the followers of the author of the message are users that subscribe to receive messages generated by the author by way of the one or more social networking applications, and wherein the number of redistributions of the messages generated by the author are a number of rebroadcasts of such messages to a publicly available data feed.

19. A computer-readable memory comprising instructions that, when executed by a processor, cause the processor to perform acts comprising:

a) receiving an indication from a user that the user wishes to search over messages broadcast by authors by way of a micro-blogging social networking broadcast application, at least some of the messages being rebroadcast by way of the micro-blogging social networking broadcast application by subscribers to the authors;

b) receiving a query from the user;

c) based at least in part upon the indication received at a) and the query received at b), locating a plurality of messages broadcast by a plurality of different authors;

d) displaying a first set of messages to the user, wherein the first set of messages is selected from the plurality of messages located at c);

e) displaying to the user an interactive graphical object that is representative of content across the plurality of messages located at c);

f) displaying to the user a graphical object that is indicative of credibility of at least one message in the first set of messages displayed to the user at d);

g) receiving a selection of a portion of the interactive graphical object displayed at e); and h) responsive to receiving the selection of the portion of the interactive graphical object at g), displaying a second set of messages to the user, wherein the second set of messages is selected from the plurality of messages located at c).

20. The computer-readable memory of claim 19, wherein the acts further comprise computing a value that is indicative of the credibility of the at least one message in the first set of messages, the value computed based upon:

a number of followers of an author of the at least one message in the social networking broadcast application, wherein the each follower in the followers subscribe to receive messages generated by the author of the at least one message;

a number of messages generated by the author by way of the social networking broadcast application; and a number of redistributions of messages generated by the author, the redistributions being a number of rebroadcasts of the messages in the social networking broadcast application to a publicly available data feed by the followers of the author.

\* \* \* \* \*